United States Patent
Fish

(10) Patent No.: US 7,362,230 B1
(45) Date of Patent: *Apr. 22, 2008

(54) LEAK DETECTION APPARATUS

(76) Inventor: Dan Fish, 24230 Whipowill La., Bonita Springs, FL (US) 34135

( * ) Notice: Subject to any disclaimer, the term of this patent is extended or adjusted under 35 U.S.C. 154(b) by 0 days.

This patent is subject to a terminal disclaimer.

(21) Appl. No.: 11/777,517

(22) Filed: Jul. 13, 2007

Related U.S. Application Data

(63) Continuation of application No. 11/686,158, filed on Mar. 14, 2007.

(51) Int. Cl.
*G08B 21/00* (2006.01)
(52) U.S. Cl. .................. 340/605; 340/500; 73/40
(58) Field of Classification Search ........ 340/605
See application file for complete search history.

(56) References Cited

U.S. PATENT DOCUMENTS

| | | | |
|---|---|---|---|
| 396,619 A * | 1/1889 | Smith | 220/571 |
| 4,136,823 A | 1/1979 | Kullberg | |
| 4,382,679 A * | 5/1983 | Lee | 356/239.4 |
| 4,998,096 A | 3/1991 | Benvenuti | |
| 5,008,652 A | 4/1991 | Woloszyk | |
| 5,163,467 A * | 11/1992 | Coe | 137/312 |
| 5,339,676 A * | 8/1994 | Johnson | 73/40 |
| 5,357,241 A | 10/1994 | Welch, Jr. et al. | |
| 5,437,303 A * | 8/1995 | Johnson | 137/312 |
| 5,440,917 A | 8/1995 | Smith et al. | |
| 5,655,561 A * | 8/1997 | Wendel et al. | 340/605 |
| 5,877,689 A | 3/1999 | D'Amico | |
| 6,035,699 A | 3/2000 | Parlante | |
| 6,128,947 A * | 10/2000 | Anderson, Sr. | 73/46 |
| 6,305,131 B1 * | 10/2001 | Romig | 52/79.1 |
| 6,523,562 B2 * | 2/2003 | Harper | 137/312 |
| 6,526,807 B1 * | 3/2003 | Doumit et al. | 340/605 |
| 6,731,215 B2 * | 5/2004 | Harms et al. | 340/605 |
| 6,950,032 B1 | 9/2005 | Hewitt et al. | |
| 7,084,776 B2 * | 8/2006 | Tacilauskas | 340/604 |
| 7,084,777 B2 | 8/2006 | Ninberg | |
| 7,230,528 B2 * | 6/2007 | Kates | 340/521 |
| 2002/0113713 A1 * | 8/2002 | Palmer | 340/605 |
| 2004/0065351 A1 * | 4/2004 | DeMartini | 134/25.2 |
| 2006/0191323 A1 * | 8/2006 | Garabedian et al. | 340/605 |
| 2006/0202846 A1 * | 9/2006 | Garabedian | 340/618 |
| 2007/0221673 A1 * | 9/2007 | Nagler et al. | 220/560.03 |

OTHER PUBLICATIONS

FloodStop Installation Manual, www.onsiteproducts.com, 2 pages, no date.

* cited by examiner

*Primary Examiner*—George Bugg
*Assistant Examiner*—Eric M Blount
(74) *Attorney, Agent, or Firm*—McDonnell Boehnen Hulbert & Berghoff LLP

(57) ABSTRACT

Leak detection apparatuses located, at least in part, in the deadspace below a floor in an abode wherein the leak detection apparatus captures, detects and signals the presence of leaking water and other aqueous solutions.

19 Claims, 4 Drawing Sheets

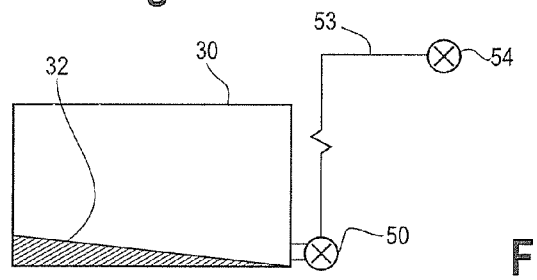
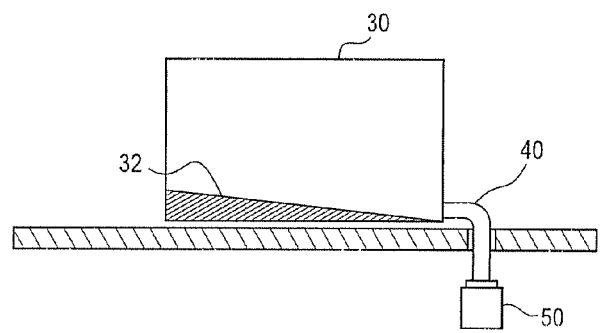
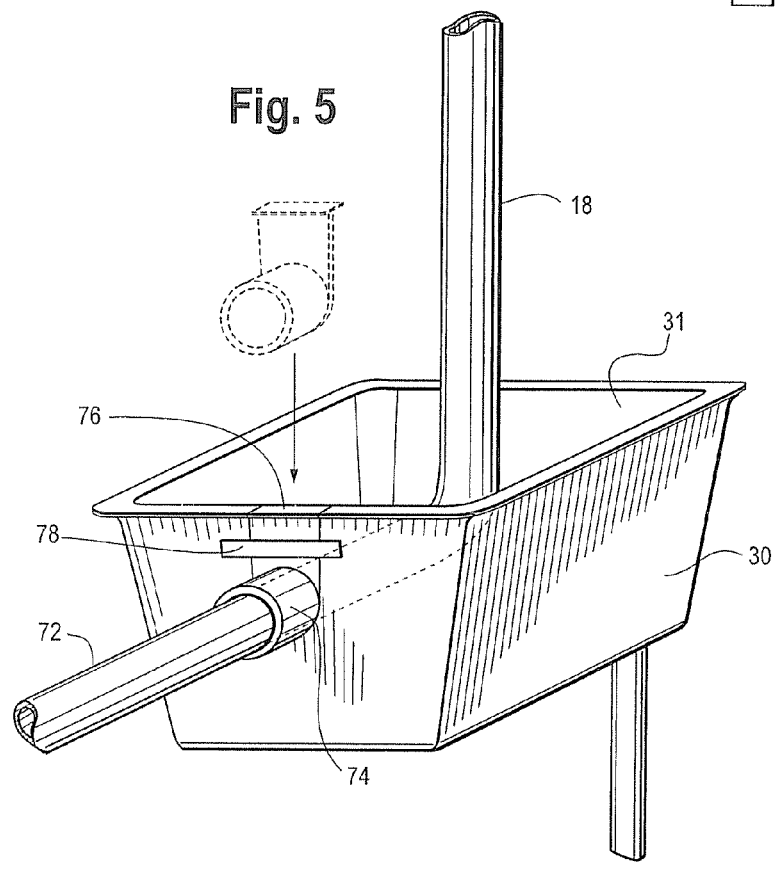

LEAK DETECTION APPARATUS

CROSS-REFERENCE TO RELATED APPLICATIONS

This is a continuation of co-pending U.S. patent application Ser. No. 11/686,158 filed on Mar. 14, 2007.

BACKGROUND OF THE INVENTION (1) Field of the Invention

This invention concerns an apparatus for indicating when a leak is present in a residential waste line such a toilet waste line.

(2) Description of the Art

Every year, hundreds of millions of dollars are spent repairing water damage caused by leaking drains, waste lines and toilets in abodes such as homes, hotels, condominiums and businesses. This problem is particularly acute in multi-story hotels and condominiums where a leak in an upper unit or room can quickly cause extensive water damage to rooms and/or units that lie below.

Attempts have been made to solve this problem by identifying leaks when they occur so that they can be stopped before damage ensues. However, the presently known methods, such as those disclosed in U.S. Pat. Nos. 7,032,435, 6,489,985, 4,705,060 and 4,011,553, typically rely upon sensors in water supply lines, in toilet tanks or on floor surfaces to identify whether or not water is moving through supply lines or to identify when water is accumulating of floor surfaces.

There are several problems with these existing leak detection systems. One problem is that they are prone to identifying leaks when none are present. For example, sensors located on floors will signal a leak when someone accidentally spills liquid on a floor. Moreover, systems that monitor water flow in pipes can erroneously identify normal water use as they leak or they might be fooled into believing that water that is leaking is not a leak.

One particularly difficult leak to identify is a leak at a toilet bowl wax seal. This is a problematic location because the wax seal is generally placed even with or slightly below the top of a floor and any leaks that occur at the seal—the point where the waste pipe meets the toilet bowl—will typically not accumulate on the floor where the toilet bowl is located. Instead, the leak usually manifests itself somewhere below the floor on which the leaking toilet is located. Therefore, leak detection systems that rely upon placing a sensor on the floor will not detect many leaks from toilet bowl wax seals. There is a need, therefore, for an unobtrusive and reliable method for identifying and signaling leaks in aqueous waste lines in homes, condominiums, offices, mobile homes and other abodes. In particular, there is a need for a reliable method to identify and signal the presence of water leaking from a toilet waste line.

SUMMARY OF THE INVENTION

One aspect of this invention is a leak detection apparatus including: an abode having a floor, the floor having a top and an underside and a deadspace below the floor underside; a waste pipe for carrying aqueous waste associated with an aqueous waste generating unit which is located above the floor top and wherein the waste pipe travels into the deadspace; a container including an opening positioned below a portion of the waste pipe located in the deadspace; a detector associated with the container the detector capable to detecting water.

Another aspect of this invention is a leak detection apparatus including: an abode having a floor, the floor having a top, an underside and a deadspace below the floor underside; a toilet located on the floor top; a waste pipe having a first end attached to the toilet, the waste pipe having a length sufficient to direct aqueous toilet waste to a location outside the abode, wherein the waste pipe travels into the deadspace; a container having a bottom, sides and an open top wherein the container open top is located below the waste pipe in the deadspace, the container further including a low point; a conduit having a first end attached to the container low point and a second end, the conduit second end being located below the conduit first end; and a water detector attached to the conduit second end.

DESCRIPTION OF THE FIGURES

FIGS. 4A and 4B are examples of configurations for associating a detector for detecting the presence of water with a container that is useful in the apparatus of the present invention; and FIG. 5 is a perspective view of an embodiment of a container useful in a leak detection apparatus of this invention that is associated with a waste pipe.

DESCRIPTION OF THE CURRENT EMBODIMENT

The present invention relates to leak detection apparatus that is located, at least in part, in the deadspace below a floor in an abode. The apparatus of this invention are capable of capturing, detecting and signaling the presence of water leaking from a waste generating unit or from a waste line that runs through the abode.

Figure 1:
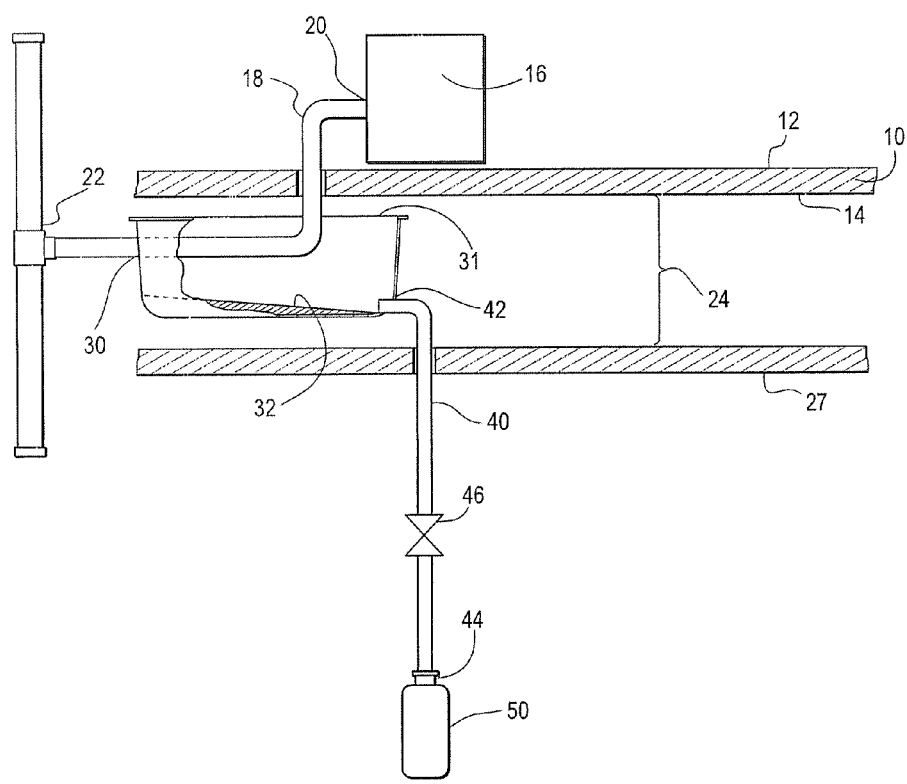
FIG. 1 is a schematic view of a leak detection apparatus embodiment of this invention.

FIG. 1 is a schematic of a leak detection apparatus embodiment of the present invention. In FIG. 1, an aqueous waste generating unit 16 is located above or on top 12 of floor 10 in an abode. Floor 10 further includes an underside 14. Waste generating unit 16 is associated with waste pipe 18 having a first end 20 associated with aqueous waste generating unit 16 and a second end 22 associated with a waste stack or with a waste line located outside of the abode such as a municipal waste line or a septic tank. A deadspace 24 is located below floor 10. Deadspace 24 is broadly defined as the space below a floor in an abode that is used for running electrical conduit, heating and air conditioning ducts, water pipes, waste lines and other utilities, piping and ducts. Generally, deadspace 24 will be formed by struts or beams that divide an upper floor 10 from a ceiling 27 of a room on the next lower floor. However, it is not necessary that deadspace 24 be defined by a lower ceiling 27. For example, where floor 10 lies above a crawl space, deadspace 24 would be defined as the space between the floor underside 14 and the ground or slab in the crawl space.

Figure 2:
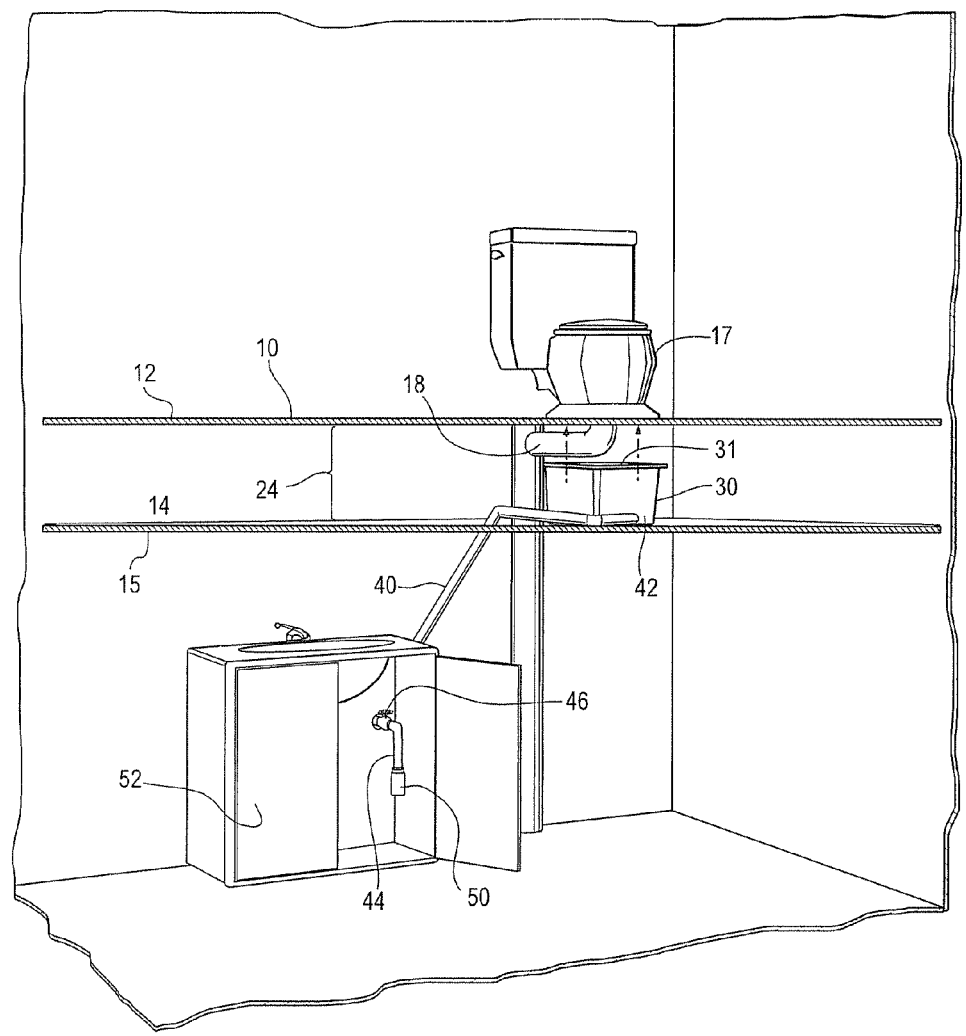
FIG. 2 is a side cutaway view of a leak detection apparatus embodiment of this invention that is associated with a toilet waste line.

Referring back to FIG. 1, a container 30 having an opening 31 is located in deadspace 24 below waste pipe 18. Container 30 will be positioned with respect to waste pipe 18 in a manner that will provide the most assurance that any leaks from waste pipe 18 and/or from aqueous waste generating unit 16 will be captured in container 30. One skilled in the art will understand where leaks occur from aqueous waste generating units and how those leaks drip from waste piping and will be able to position container 30 such that it can capture water leaking from waste pipes and/or aqueous waste generating units 16. For example, where aqueous waste generating unit 16 is a toilet 17, such as shown in FIG. 2, container 30 will be placed below the toilet wax ring and waste pipe first end 20. Generally there is an elbow in waste pipe 18 immediately below the toilet and container 30 will be positioned below the elbow as well. Moreover, most waste pipes 18 will have an elbow immediately below the point where the line enters deadspace 24 so that waste pipe 18 can run laterally to a waste stack or larger waste pipe. Container 30 will generally be located below the waste pipe elbow because leaks would generally but not always drip from pipe 18 into deadspace 24 at the elbow. In FIG. 1, a conduit 40 having a first end 42 associated with container 30 and a second end 44 associated with detector 50 is used to direct leaking waste water captured in container 30 to detector 50.

FIG. 2 represents a current embodiment of a leak detection apparatus of this invention. In FIG. 2, a toilet 17 is located on top 12 of floor 10. The abode depicted includes a deadspace 24 defined as the space between underside 14 of floor 10 and the top of ceiling 15 of a lower floor. A container 30 having an open top 31 is located below toilet 17 and below waste pipe 18 which emerges from the bottom of toilet 17 and runs into waste stack 19. A conduit 40 is attached at a first end 42 to the bottom periphery of container 30. A conduit second end 44 is located in a vanity 52 located in a room or space on a floor below the floor on which toilet 17 is located.

Conduit 40 will typically be ⅜" to ½" diameter PVC pipe. However, conduit 40 can be made from any type of plastics or metal materials used in building piping. In addition, the diameter of conduit 40 can vary depending on space constraints and venting constraints. A detector 50, in the form of a transparent bottle or jar is attached to second end 44 of conduit 40 in FIG. 2. A shut-off valve 46 allows the glass jar to be removed from conduit second end 44 by unscrewing, unclamping or by some other means while retaining any leaked water in container 30. Shut-off valve 46 also provides a method for draining waste water in container 30 into a bucket or some other disposal container.

In the embodiments discussed above, aqueous waste generating unit 16 may be any type of unit in a household or building that is capable of generating aqueous waste. Non-limiting examples of such units include but are not limited to sinks, basins, tubs, toilets, washing machines, humidifiers, dehumidifiers, water softeners and any other device that creates an aqueous waste stream in a household or business. As mentioned above, toilets pose a particularly high leak risk because they are associated with a waste pipe using often unreliable wax rings and because the valves controlling the water inlet into the toilet tank often malfunction and allow water to run into the toilet waste line continuously. Thus, if a gap does exist in the toilet wax ring, each the time the toilet is flushed, there will be a small leakage of water. Moreover, if the leaking toilet has an inlet valve that also leaks, then there can be a continuous leakage of a small amount of water which, over time, can result in a dramatic amount of damage to walls and ceilings in spaces below the toilet.

Figure 3:
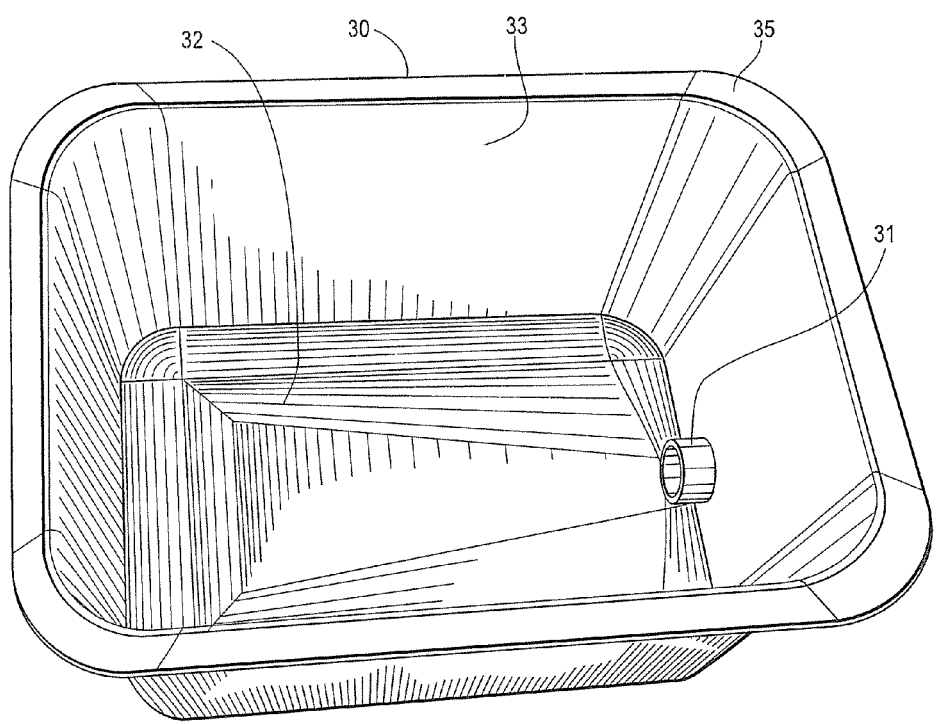
FIG. 3 is a perspective view of a container useful in a leak detection apparatus of this invention.

Container 30 is an important feature of the leak detector apparatus of this invention. Container 30 may be any type of container that is capable of being installed in deadspace 24 and that is capable of capturing water leaking from an aqueous waste generating unit 16 and/or a waste pipe 18. One container embodiment is shown in FIG. 3. Container 30 in FIG. 3 includes a pitched bottom surface 32 and side walls 33. Container 30 shown in FIG. 3 also includes a top rim 35 running around its top periphery. The combination of container bottom 32, side walls 33 and rim 35 forms a reservoir which captures and holds leaking waste water. Moreover, container 30, shown in FIG. 3, includes an outlet port 38 which is connectable to either a detector 50 or to a conduit 40. The container shown in FIG. 3 may be manufactured from any known container materials and is preferably manufactured from plastics used in injection molding.

A rigid container 30, such as shown in FIG. 3, is very useful in the present invention because it can be easily placed in a deadspace by either attaching it via its rim 35 to underside 14 of floor 10 or it can be located in deadspace 24 by other methods such as by suspending it from floor joist, by resting on it on top of ceiling 27 or by any other means known in the construction art for securing a container, pipes, heating and ventilation ducts and so forth in a deadspace. Preferably, container 30 is attached to the underside 14 of floor 10 using adhesives, screws or nails, and in the case of cement floors using tapcons—concrete screws.

Container 30 does not have to be rigid. Container 30 may be made of any material that is able to capture and retain waste water and most preferably up to from about 0.5 to 2 gallons or more of waste water. In an alternative embodiment, container 30 may be made of flexible material such as a thin plastic material like a plastic bag having an open end that is located below aqueous waste generating unit 16 in deadspace 24. Alternatively, container 30 may be a semi-rigid plastic material like the plastic containers used in boxed wine containers or cafeteria milk containers. Regardless of the material used for its manufacture, container 30 may have an outlet port 38 and, in situations where container 30 is a flexible or semi-flexible container, the outlet port 38 may be welded onto the container at a low point.

It is preferred that container 30 is pitched or that it is manufactured or installed so that it as a low point where fluid will travel to or collect. Container 30 shown in FIG. 3 includes a pitched bottom surface 32. Pitched surface 32 will direct any leaking water to one edge of container 30 where it can be either detected in the container or directed through conduit 40 through to detector 50. In an alternative embodiment, container 30 may be placed on a pitched surface so container opening 31 is at the container low point. In addition container 30 can have a spill over pipe that directs waste water in the container into a drain in the event container 30 becomes filled with waste water.

In a more preferred embodiment, shown in FIG. 5, container 30 will include a cut-out 70. A horizontal portion 72 of waste pipe 18 will pass through cut-out 70. This allows the portion of waste pipe 18 where leaking would be expected to be located inside container 30. A cut-out 70 may be made in container 30 using a saw or other cutting tool. Alternatively, container 30 may be manufactured with a cut-out 70. Cut-out 70 should be large enough for waste pipe 18 to pass through. Waste pipe 18 can include an optional seal 74 such as insulation or gasket material that allows waste pipe 18 to fit snugly into cut-out 70.

A cut-out portion 76 may be placed back into cut-out 70 to further secure waste pipe 18 in cut-out 70. Cut-out portion 76 may be attached to container 30 by gluing, or by any other method known to one skilled in the art. In FIG. 5, cut-out portion 76 is attached to container 30 with a strip 78 that can be welded, glued or otherwise attached to container 30. It is useful to replace cut-out portion 76 in container 30 to prevent rodents and other vermin from entering container 30. A net placed over cut out 74 and/or over top 31 of container 30 will perform a similar function.

Another important feature of the leak detector apparatus of this invention is the detector 50. The term "detector" is used herein to refer to any type of device, mechanism, or assembly that is capable of providing a visible, audible, electronic so some other indication of the presence of water. By water, it is meant any type of solution that includes at least a small amount of water and preferably 50% or more and most preferably 95% or more water. Thus, the detector and apparatus of this invention can be used to detect a leak that consists of very little to essentially 100% fresh water.

Examples of detectors that provide a visible indication of the presence of water include but are not limited to transparent jars, buckets, and apparatuses that detect water and provides an electrical signal that is capable of being used to activate a light bulb, LED, or some other visible, audible or mechanical signal to express that the detector has detected water. In FIGS. 1 and 2, detector 50 is a transparent vial or bottle is located at the second end 44 of conduit 40 that provides a visible indication of the presence of water. The visible indication being the presence of water in the vial. In one embodiment, a powdered water soluble dye or other material that colors the waste water that drops into the vial or bottle may be used to enhance the visible indication of the presence of the water. Another detector that provides a visible indication of the presence of water is a detector that provides an electrical signal when it water contacts. Such detectors are discussed, for example in U.S. Pat. Nos. 7,032,435, 6,489,985, 4,705,060 and 4,011,553, the specifications of each of which are incorporated herein by reference.

Detector 50 may be placed directly into container 30, either in the top of the container or associated with the bottom or low point in container 30. If detector 50 is directly associated with container 30, then conduit 40 may be completely omitted from the assembly. In this embodiment, shown in FIG. 4A, detector 50 is electrically connected via electrical line 53 to a switch 54 that activates a light bulb or some other visible, audible or electrical indication of the presence of water. In the embodiment shown in FIG. 4B, detector 50 is a visible detector that is associated with a conduit attached to the bottom edge of container 30.

Where an audible indication of the presence of water is desired, then detector 50 may be associated with a switch that turns on a siren, a beeper or some other device for providing an audible indication of the presence of water. The term audible indication as used herein encompasses sending a signal to a system to provide an indication of the presence of water in the form of a telephone call, an alarm, a beep, a voicemail message, an email message and so forth and includes sending a signal to a monitored alarm system.

In another embodiment, an electrical signal activated by detector 50 can actuate a valve to close it to stop water supply to the leaking waste generating unit.

In still another embodiment a single water detector can be used to detect leaking water captured by a plurality of containers 30. In one aspect of this embodiment, each of the plurality of containers 30 will include a different color dye so that the source of the leak can be identified by the color of water collected in, for example a visible detector 50. In yet another embodiment, chlorine tablets can be placed in container 30 to disinfect any leaking waste water.

Although certain presently preferred embodiments of the invention have been described herein, it will be apparent to those skilled in the art to which the invention pertains that variations and modifications of the described embodiment may be made without departing from the spirit and scope of the invention.

Accordingly, it is intended that the invention be limited only to the extent required by the appended claims and the applicable rules of law.

What is claimed is:

1. A leak detection apparatus comprising:
    an abode having a floor, the floor having a top and an underside and a deadspace below the floor underside;
    an aqueous waste generating unit which is located on or above the floor top;
    a waste pipe having a first end associated with the aqueous waste generating unit wherein at least a portion of the waste pipe is located in the deadspace;
    a container including an opening positioned below a portion of the waste pipe located in the deadspace wherein the container includes one side having a cut-out and wherein a portion of the waste pipe in the deadspace is located in the container such that a horizontal portion the waste pipe passes through the cut-out; and
    a detector associated with the container, the detector capable of detecting the presence of water wherein the deadspace is not a crawlspace.

2. The leak detection apparatus of claim 1 wherein the aqueous waste generating apparatus is selected from the group consisting of sinks, washing machines, bath tubs, showers, toilets, humidifiers, and furnaces.

3. The leak detection apparatus of claim 1 wherein the aqueous waste generating apparatus is a toilet.

4. The leak detection apparatus of claim 1 wherein the container has a bottom, side walls and an open top.

5. The leak detection apparatus of claim 1 wherein the container is a plastic bag having an open top.

6. A leak detection apparatus comprising
    an abode having a floor, the floor having a top and an underside and a deadspace below the floor underside;
    an aqueous waste generating unit which is located on or above the floor top;
    a waste pipe having a first end associated with the aqueous waste generating unit wherein at least a portion of the waste pipe is located in the deadspace;
    a container including an opening positioned below a portion of the waste pipe located in the deadspace wherein the container includes one side having a cut-out and wherein a portion of the waste pipe in the deadspace is located in the container such that a horizontal portion the waste pipe passes through the cut-out; and
    a detector associated with the container, the detector capable of detecting the presence of water wherein the container has a low point and a conduit having a first end and a second end, the conduit first end associated with the container low point and wherein the detector is attached to the conduit second end.

7. The leak detection apparatus of claim 6 wherein the conduit second end is located below the conduit first end.

8. The leak detection apparatus of claim 6 wherein the detector provides a visible indication of the presence of water.

9. The leak detection apparatus of claim 6 wherein the detector provides an electronic indication of the presence of water.

10. The leak detection apparatus of claim 6 wherein the detector provides an audible indication of the presence of water.

11. The leak detection apparatus of claim 7 wherein the detector is transparent bottle located at the second end of the conduit.

12. The leak detection apparatus of claim 11 wherein the transparent bottle contains an aqueous activated dye.

13. The leak detection apparatus of claim 6 wherein the container rests on a platform in the deadspace.

14. The leak detection apparatus of claim 6 wherein the container is attached to the underside of the floor.

15. A leak detection apparatus comprising:
   an abode having a floor, the floor having a top and an underside and a deadspace below the floor underside;
   a toilet located on the floor top;
   a waste pipe having a first end attached to the toilet, the waste pipe having a length sufficient to direct aqueous toilet waste to a location outside the abode, wherein the waste pipe travels into the deadspace;
   a container having a bottom, sides and an open top wherein the container open top is located below the waste pipe in the deadspace, the container further including a low point;
   a conduit having a first end attached to the container low point and a second end located below the conduit first end; and
   a detector attached to the conduit second end wherein the conduit second end is located in a vanity that lies in a space below the floor and deadspace.

16. The leak detection apparatus of claim 15 wherein the detector is selected from the group consisting of a detector that provides a visible indication of the presence of water, a detector that provides an audible indication of the presence of water and a detector the provides an electronic indication of the presence of water.

17. The leak detection apparatus of claim 15 wherein the water detector is a transparent bottle.

18. The leak detection apparatus of claim 17 wherein the transparent bottle contains water activated dye.

19. The apparatus of claim 1 wherein the deadspace is the space defined by a floor underside and a ceiling of a room on the next lower floor of the abode.

* * * * *